United States Patent
Warner et al.

(10) Patent No.: US 11,192,705 B2
(45) Date of Patent: Dec. 7, 2021

(54) SMART 1 TOUCH

(71) Applicant: 1TOUCH HOLDINGS, INC., Farmington, CT (US)

(72) Inventors: Jim Warner, Chicago, IL (US); Judith Grupp, Farmington, CT (US); Roger LaFlamme, Sturbridge, MA (US)

(73) Assignee: 1TOUCH HOLDINGS, INC., Farmington, CT (US)

( * ) Notice: Subject to any disclaimer, the term of this patent is extended or adjusted under 35 U.S.C. 154(b) by 102 days.

(21) Appl. No.: 16/507,000

(22) Filed: Jul. 9, 2019

(65) Prior Publication Data

US 2020/0108991 A1   Apr. 9, 2020

Related U.S. Application Data

(60) Provisional application No. 62/695,306, filed on Jul. 9, 2018.

(51) Int. Cl.
| | |
|---|---|
| *B65D 75/00* | (2006.01) |
| *B65D 75/58* | (2006.01) |
| *G01F 13/00* | (2006.01) |
| *G01L 19/00* | (2006.01) |
| *A61J 1/10* | (2006.01) |

(Continued)

(52) U.S. Cl.
CPC ....... *B65D 75/5877* (2013.01); *B65D 75/008* (2013.01); *G01F 13/00* (2013.01); *G01L 19/00* (2013.01); *A61J 1/10* (2013.01); *A61J 1/1431* (2015.05); *A61J 2200/30* (2013.01); *A61J 2200/70* (2013.01); *A61J 2200/76* (2013.01); *A61J 2205/60* (2013.01); *B05B 11/00412* (2018.08); *B05B 11/3008* (2013.01); *B05B 11/3032* (2013.01); *B65D 2203/02* (2013.01); *B65D 2203/10* (2013.01); *G01F 11/084* (2013.01); *G01S 19/01* (2013.01)

(58) Field of Classification Search
CPC .............. B65D 75/5877; B65D 75/008; B65D 2203/02; B65D 2203/10; G01F 13/00; G01F 11/084; G01L 19/00; A61J 1/10; A61J 2200/76; A61J 1/1431; A61J 2200/30; A61J 2200/70; A61J 2205/60; G01S 19/01; B05B 11/3008; B05B 11/3032; B05B 11/00412
See application file for complete search history.

(56) References Cited

U.S. PATENT DOCUMENTS

| | | | | |
|---|---|---|---|---|
| 5,188,259 | A | * | 2/1993 | Petit ...................... B05C 17/002 222/146.5 |
| 5,551,599 | A | * | 9/1996 | Niss ...................... A21C 15/005 222/63 |

(Continued)

FOREIGN PATENT DOCUMENTS

GB        2178001 A  *  2/1987  ........... B67D 1/0001

*Primary Examiner* — Frederick C Nicolas
(74) *Attorney, Agent, or Firm* — DeLio Peterson & Curcio LLC; Peter W. Peterson; Brian G. Schlosser

(57) ABSTRACT

A method and device for conveying tracking and communicating information concerning a dispensed fluid, the device including a measured dispensing device attached to a flexible collapsible container, the device including a sensor for measuring a physical property relating to the dispensing operation, and a communication device configured to communicate information determined by the sensor to a remote device.

16 Claims, 10 Drawing Sheets

(51) Int. Cl.
*G01S 19/01* (2010.01)
*G01F 11/08* (2006.01)
*A61J 1/14* (2006.01)
*B05B 11/00* (2006.01)

(56) References Cited

U.S. PATENT DOCUMENTS

| | | | |
|---|---|---|---|
| 6,053,888 A | 4/2000 | Kong | |
| 6,790,198 B1 | 9/2004 | White | |
| 7,419,322 B2* | 9/2008 | Laflamme | A47K 5/1208 |
| | | | 401/188 R |
| 8,123,073 B2* | 2/2012 | LaFlamme | A47K 5/1208 |
| | | | 222/1 |
| 8,387,833 B2* | 3/2013 | LaFlamme | B05B 11/3032 |
| | | | 222/207 |
| 8,590,752 B2* | 11/2013 | Mileti | G01F 11/082 |
| | | | 222/207 |
| 10,259,645 B2* | 4/2019 | LaFlamme | G01F 11/44 |
| 2006/0253087 A1* | 11/2006 | Vlodaver | A61M 31/00 |
| | | | 604/275 |
| 2008/0203110 A1* | 8/2008 | LaFlamme | B65D 81/3261 |
| | | | 222/135 |
| 2010/0176151 A1* | 7/2010 | Johnson | B65D 77/067 |
| | | | 222/92 |
| 2010/0214106 A1 | 8/2010 | Braun | |
| 2011/0253738 A1* | 10/2011 | Mileti | B05B 11/00412 |
| | | | 222/1 |
| 2012/0029433 A1 | 2/2012 | Michaud | |
| 2015/0129611 A1* | 5/2015 | Vulpitta | B67D 3/0022 |
| | | | 222/101 |
| 2015/0257664 A1* | 9/2015 | Esposito | A61B 5/02444 |
| | | | 600/500 |
| 2016/0213565 A1 | 7/2016 | Aesynt | |
| 2017/0334632 A1* | 11/2017 | LaFlamme | G01F 11/288 |
| 2018/0250454 A1* | 9/2018 | Jansson | A61M 1/0245 |

* cited by examiner

SMART 1 TOUCH

BACKGROUND OF THE INVENTION

Field of the Invention

The present invention relates to methods and devices for the accurate dispensing, tracking, and reordering of dispensed fluids.

Description of the Background

The technical problems solved by the present invention are: the delivery of information to users of fluids, ensuring that users of fluids use an accurate measurement(s) at the specified time, GPS location of fluid dispensing activity, accurate tracking of the time and dose, enable reminders for use and amount of the dosage to prevent overdose and to track compliance, and prompt for reorder to ensure ongoing compliance for which there is no current solution available, and communication of tracking information to the user, physicians, health care providers, retailers, manufacturers and others who wish to monitor usage, manage compliance, and reorder the fluid. Smart 1 TOUCH will integrate to electronic data collection, smart devices and audible data devices.

SUMMARY OF THE INVENTION

The present invention solves the technical problems described above by either combining a mechanical measured fluid dispenser or sensor technology, such as Bluetooth or RFID, with hardware and software features that detect the time and amount of a fluid dispensing operation, and communicate that information to a user's smart phone app or software which can then optionally, and preferably according to a user-selection, communicate that information to the user's physician, pharmacy, retailers, manufacturers or other interested parties requiring compliance, monitoring and reordering capabilities.

According to various embodiments of the invention, the mechanical or sensor based measured fluid dispenser of the type disclosed in, for example, U.S. Pat. Nos. 8,123,073, 7,419,322, 8,387,833, 10,259,645 and/or in U.S. patent application Ser. No. 15/941,893, the disclosures of which are incorporated herein in their entirety.

According to further embodiments of the invention, the sensor or mechanical measured fluid dispenser may include a chip or other sensor configured to detecting a physical change caused by the depression of the dispenser's actuator. For example, the sensor may be a pressure sensor, or a flow rate sensor, a timer, or some combination thereof. The sensor may be any single sensor or combination of sensors that provide information concerning the amount of fluid that is dispensed upon the activation of the dispenser's actuator. Accordingly, the sensor may be located inside or beneath the actuator itself, located somewhere in the fluid channel/pathway, or in dispenser case enclosures.

According to another embodiment, the mechanical measured dispenser may include an adjustable dose mechanism according to which the amount of the dose may be adjusted by the user. According to a further feature of this embodiment, one or more sensors may be provided to determine the adjustment state of the adjustable dose feature. According to one embodiment, the sensor that determines the adjustment state of the adjustable dose mechanism may be separate from and optionally in addition to the sensor(s) that detects and/or measures the amount of a dose when the dose actuator is actuated.

According to a further embodiment, the measured dosing device may be reusable, according to which it may be removed from a first fluid pouch when the first fluid pouch is empty and attached to a second fluid pouch with a fresh supply of fluid.

According to further embodiments, the fluid pouches may include a smart label and/or RFID tag. According to aspects of these embodiments, a user may scan the smart label or RFID tag with a smart phone app which would then cause information concerning the fluid to be displayed to the user. Such information might include how to administer the fluid by using the mechanical measured dispenser or pouch dispenser, how to use the app to remind the user to administer the fluid, track compliance, location of where to reorder, automatically reorder, or identify location where fluid can be obtained, how to use the app to track transmitted dosage and time information and/or to transmit such information to interested parties, according to the user's preferences and selections.

Accordingly, the present invention provides a reliable and verifiable way for users of fluids to be automatically reminded to administer a dosage, for users to be sure that the appropriate dosage is being administered, and physician, pharmacy, retailers, manufacturers, or others requiring compliance, monitoring and reordering capabilities can reliably track and document usage.

BRIEF DESCRIPTION OF THE DRAWINGS

The subsequent description of the preferred embodiments of the present invention refers to the attached drawings, wherein:

FIG. 1b is an alternate rendition of the embodiment shown in FIG. 1a.

FIG. 2 is a bottom perspective view of the dosing/control collar shown in FIG. 1a.

FIG. 3 is a cross-sectional view of the dosing/control collar shown in FIG. 1a.

FIG. 5b is an alternate rendition of the embodiment shown in FIG. 5a.

FIG. 6b is a side elevation view of the adjustable fluid dosing dispenser according to the embodiment of FIG. 6a.

DETAILED DESCRIPTION

Figure 1A:
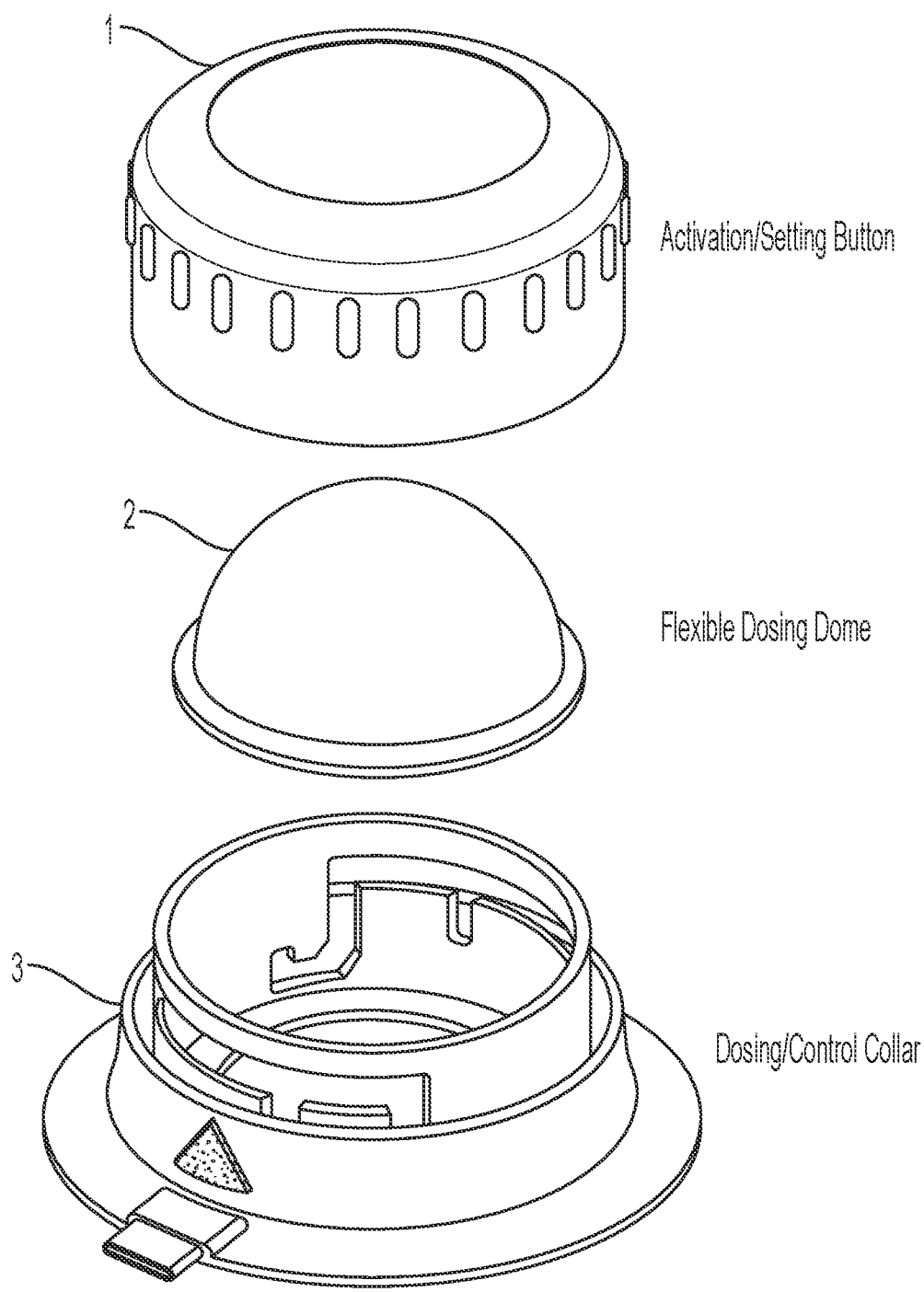
FIG. 1a is an exploded perspective view of an adjustable fluid dosing dispenser according to an embodiment of the invention.
Figure 1B:
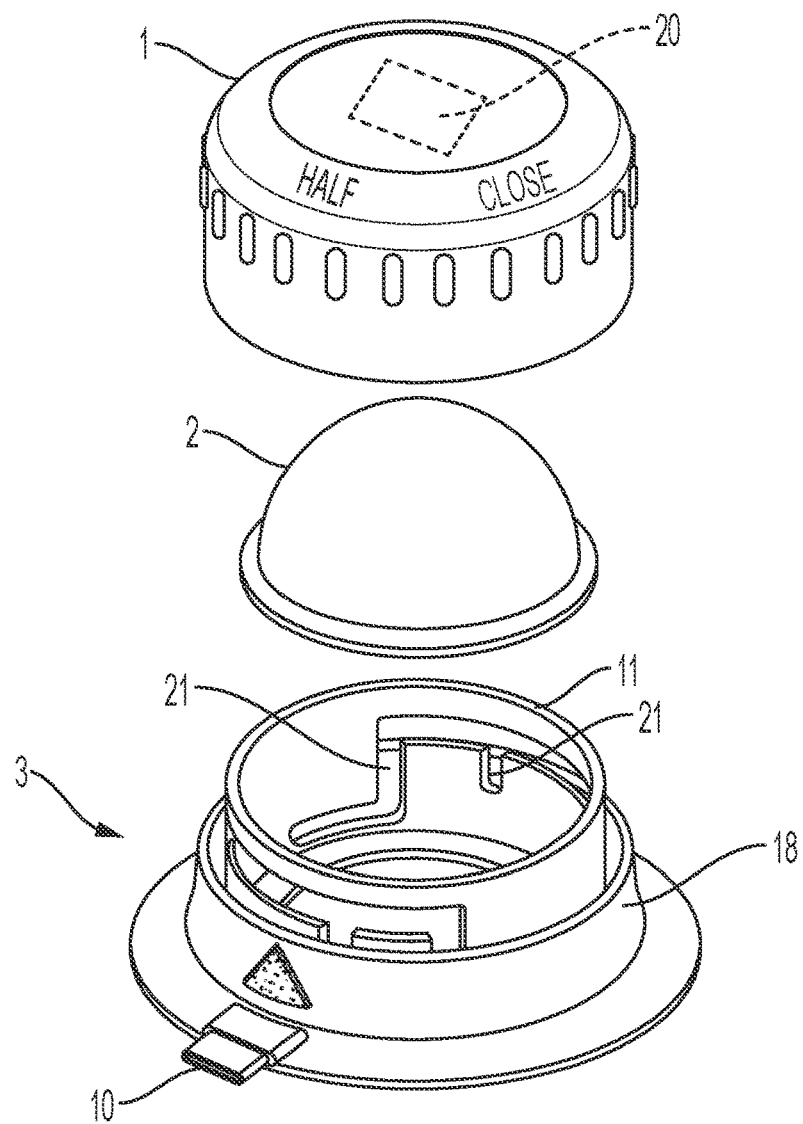
Figure 1C:
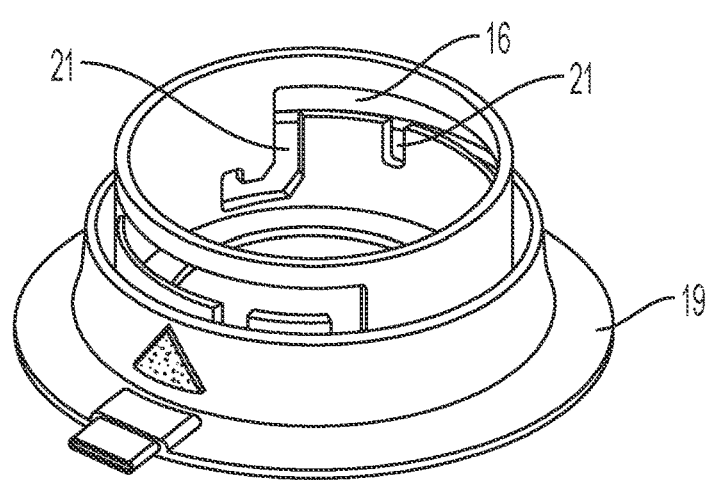
FIG. 1c is a perspective view of an adjustable fluid dosing dispenser dosing collar with an alternative slot design.
Figure 1D:
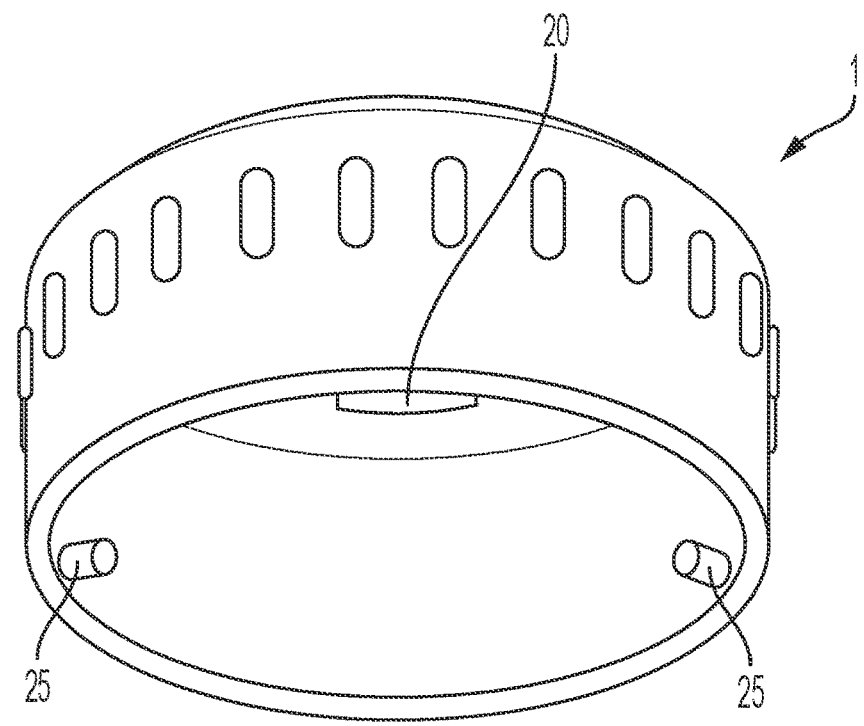
FIG. 1d is a bottom perspective view of the dosing dial/button.
Figure 2:
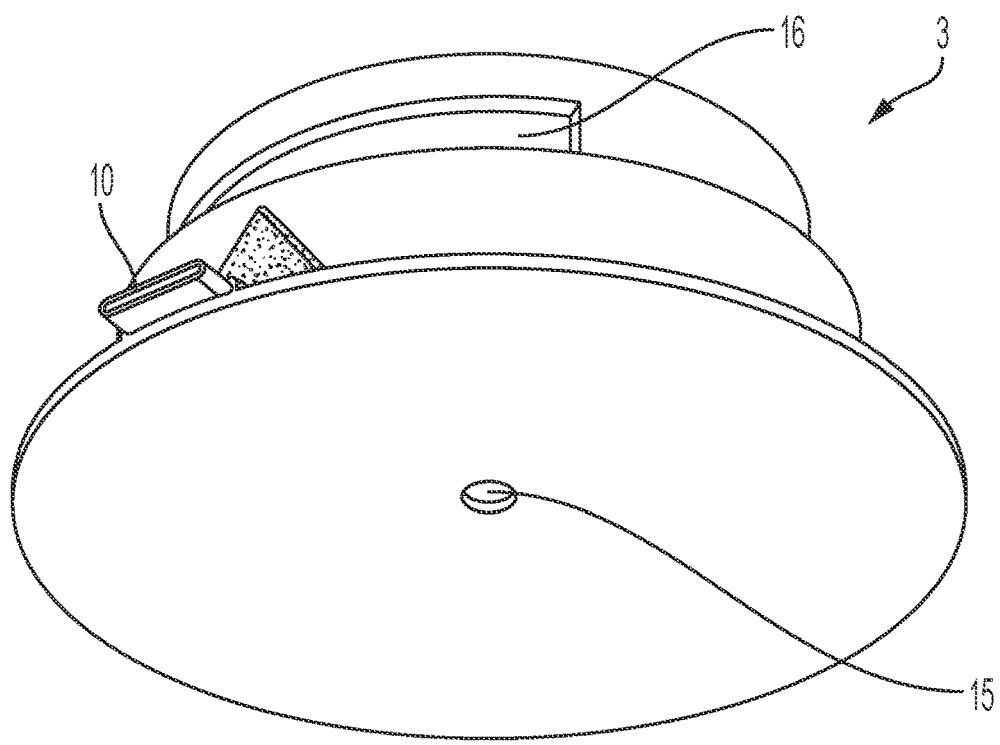

The present invention is a device for dispensing fluid from a pouch, the device capable of being set to different discrete and repeatable/equal dispensing amounts, depending on the amount of fluid required to be dispensed by the user for various applications and uses. The device may also be set to an "off" or "closed" position to prevent accidental dispensing of fluid when not in use. The device is preferably configured to be affixed to the outer surface of a fluid container 50, which fluid container is preferably a flexible bag or pouch. According to various embodiments, at least one surface of the fluid container 50 or a sufficient portion of the fluid container 50 is flexible to allow the container to collapse as fluid is withdrawn therefrom. In the case that the entire fluid container 50 is not made of flexible material, the dispensing device is preferably attached to a portion of the container 50 that is flexible and which is collapsible as fluid is dispensed from the container 50.

The device also includes one or more sensors 20 configured to record, store and/or transmit one or more physical properties of the device, particularly when the dispensing device is actuated in order to dispense fluid and/or when the device is adjusted to a particular dose.

FIGS. 1*a*-1*e* show an embodiment of the device including a dosing/control collar 3, a flexible dosing dome 2, and a combined dose setting dial and dose delivery button 1. The flexible dosing dome 2 and the dosing/control collar 3, when assembled, form the pump or dosing chamber. The dosing/control collar 3 is preferably cylindrical in shape with concentric inner and outer annular shafts/columns 11,18 rising from a common base and defining a narrow channel 17 between them. The exterior of the outer annular shaft 18 may feature a flange 19 that extends away from the center of the shaft. The interior shaft 11 also features a plurality of horizontal and vertical dosing and rotation channels or slots 21 that receive and interact with corresponding nubs 25 on the outside surface of the dose dial/button 1. According to an alternative embodiment, the dosing and rotation channels may be on the shaft of the dose dial/button 1 and the nubs 25 may be on the outside surface of the inner annular shaft 11. The horizontal slots 16 are the rotation slots and may have a plurality of detente locations so that the user can tactically feel the progress of the dial as it is being rotated. The vertical channels 21 are the dosing slots and have differing depths (measured from the horizontal slot 16 to the bottom of the vertical slot) which correspond to different dispensing amounts. According to a preferred embodiment, each vertical slot 21 in the inner annular shaft 11 is paired with a second vertical slot 21 of the same depth, spaced apart on the inner annular shaft 11, and each nub 25 on the dose dial/button 1 is paired with a second nub 25 spaced apart on the dose dial/button 1 at a location that corresponds to the location of the second vertical shaft 21. When the dial/button 1 is rotated so that a nub 25 on the exterior of the dial/button 1 lines up with a vertical slot 21, the button 1 can be depressed to dispense fluid. The limit of depression limits the amount dispensed, and the depth of the vertical slot 21 limits how far the button 1 can be depressed because when the nub 25 hits the bottom of the vertical slot 21, the dial/button 1 is prevented from being depressed any further without breaking the nub 25, the slot/channel 21, or both.

According to one embodiment, there is at least one vertical slot or set of vertical slots 21 for a "Full" dose, and there is at least one second vertical slot or set of vertical slots 21 for a "Half" or "Partial" dose. According to other embodiments, there may be a third and fourth vertical slots or sets of vertical slots 21 for other fractional doses, for example, ¾ dose, ⅔ dose, ⅓ dose and ¼ dose.

Figure 3:
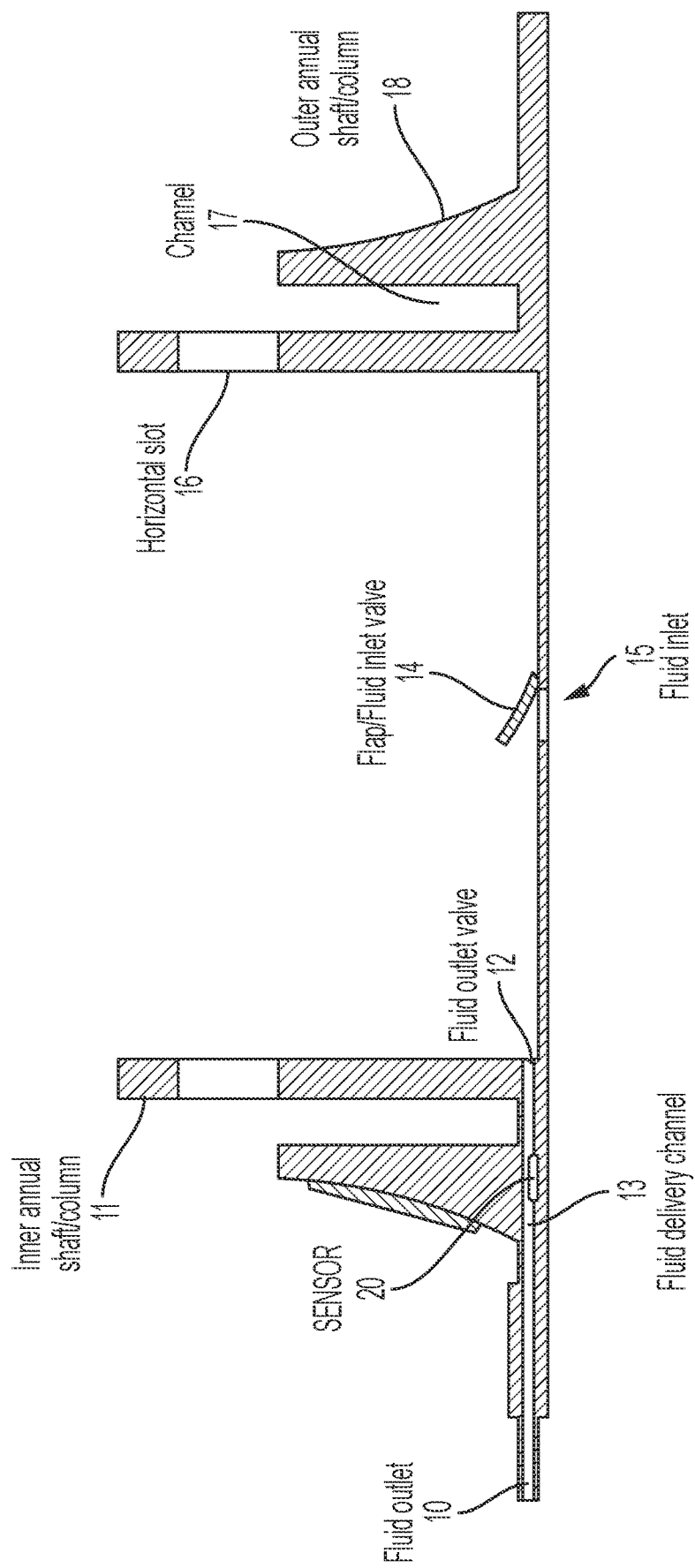

The dosing control collar 3 also features a through-opening 15 in the bottom surface to accommodate the entry of fluid, fluid inlet valve 12, represented in FIG. 3 as a flexible flap that is configured to lie over the through-opening, a fluid outlet 10 on the outside surface of the dosing control collar 3, and a fluid delivery channel 13 between said fluid inlet 15 and said fluid outlet 10.

Figure 4:
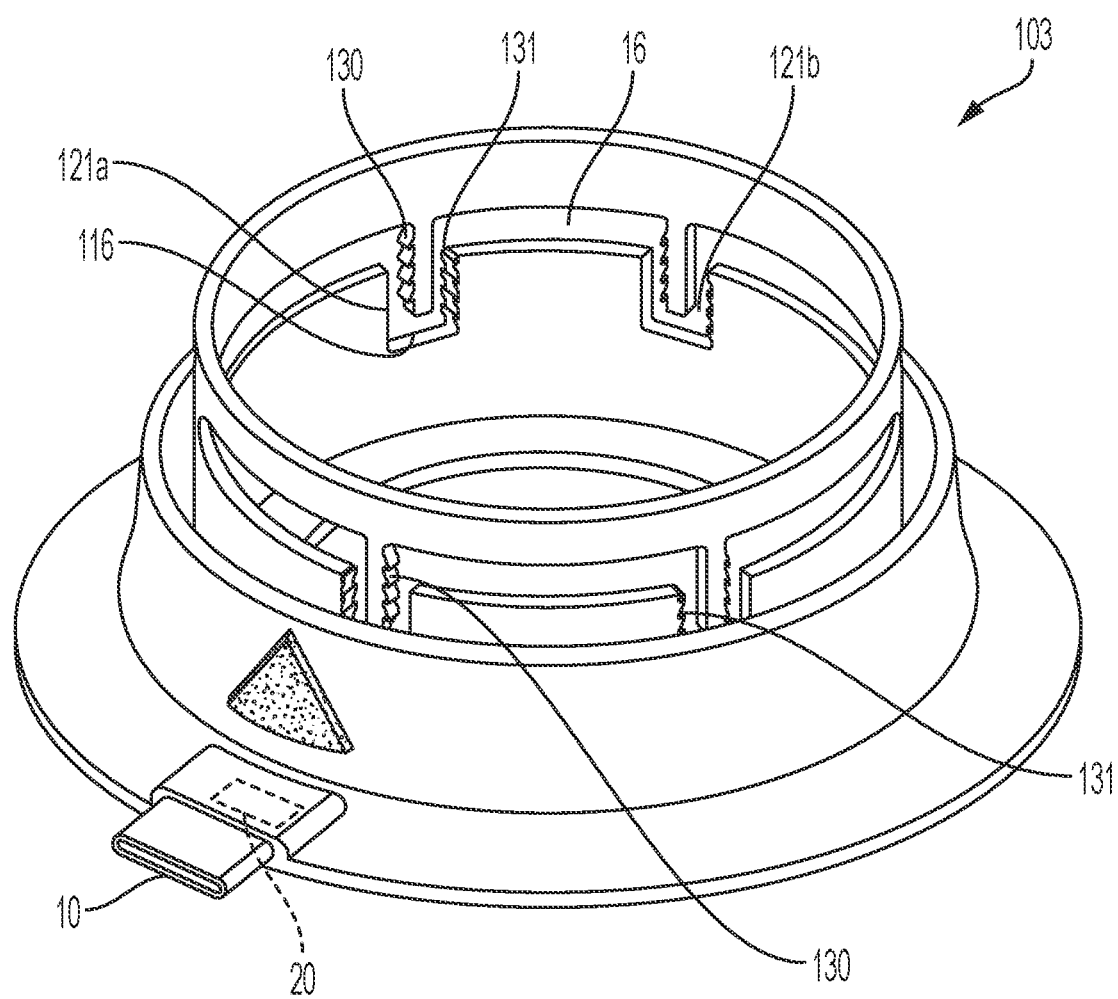
FIG. 4 is a perspective view of a dosing/control collar according to a further alternative embodiment of the invention.

According to a further alternative embodiment shown in FIG. 4, the dosing control collar 3 may have separate dosing slots 121*a* and return slots 121*b*. According to this embodiment, the dosing slots 121*a* may have downward facing teeth or prongs 130 which prevent the nubs 25 from traveling upwards, thus requiring that the dial/button 1 be fully depressed before it returns to the set position. Since the nubs 25 cannot travel upwards in the dosing slots 121*a*, separate return slots 121*b* are provided adjacent the dosing slots, connected by a horizontal slot 116. The return slots 121*b* preferably have upward facing teeth or prongs 131 to prevent the nubs 25 from traveling downward while in the return slots 121*b*.

The dose setting dial/dose delivery button is preferably manufactured of relatively rigid plastic having a rigid bottom portion that snaps into the channel 17 formed between the inner and outer annular shafts 11,18 of the base (dosing/control collar 3).

The dose setting dial/dose delivery button 1 and the dosing/control collar 3 are preferably made of a rigid plastic material. Nubs 25 molded to or otherwise formed on the interior surface of the dial/button 1 rest inside the slots formed in the interior shaft 11. When a user presses the dial/button 1, the dial/button 1 forces the flexible dosing dome 2 downward to evacuate the interior volume of the dome 2 via the fluid outlet 10; when the dial/button 1 is released, the flexible dosing dome 2 returns to its original shape, forcing the dial/button 1 upward, and drawing fluid into the interior of the dome 2 under vacuum action.

The flexible dosing dome 2 is preferably made of shape memory elastomeric material that returns to its original shape after deformation.

Figure 5A:
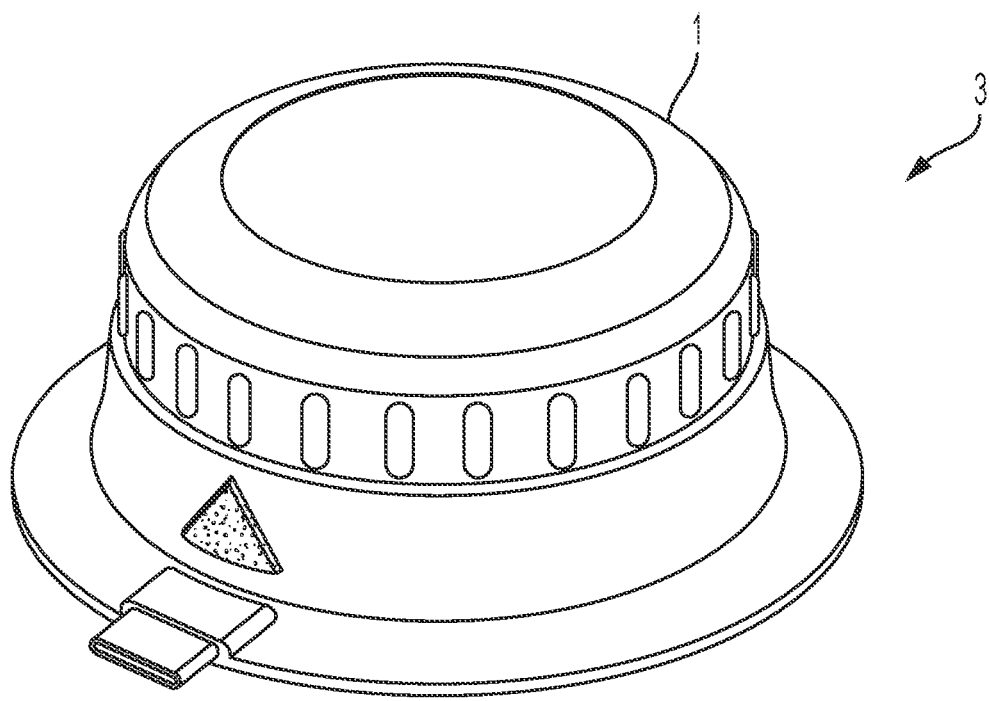
FIG. 5a is a perspective view of an assembled adjustable fluid dosing dispenser according to an embodiment of the invention in a closed/locked position.
Figure 5B:
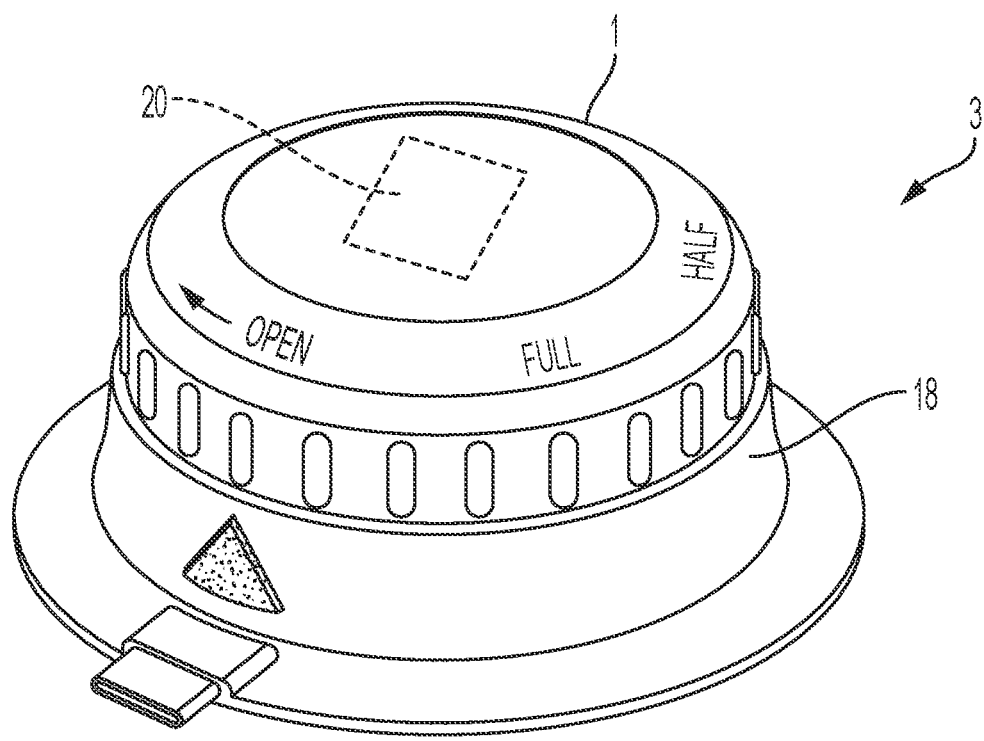

FIGS. 5*a* and 5*b* show these three parts assembled into an adjustable fluid dispensing device according to the invention in which the flexible dosing dome 2 is sealed to the base inside the interior column 11 of the dosing/control collar 3 and the bottom portion of the dose setting dial/dose delivery button 1 is snapped over the flexible dosing dome 2 into the channel 17 between the inner and outer shafts 11,18. The upper portion of the dial/button 1 projects above the top of the dosing/control collar 3. According to a preferred embodiment, the perimeter of the upper portion of the dial/button 1 has molded or printed indicia such as "Open" "Closed" and "FULL" and "HALF" to indicate the rotary position of the dial 1 that corresponds to various functions or dispensing amounts. Each of these indicia corresponds to a nub/slot combination that permits no depression, full depression, half depression, or other partial depression to dispense a corresponding amount of fluid. Likewise, the outside surface of the outer shaft 18 of the collar 3 preferably has printed or molded or other indicia indicating the location on the collar 3 that must be lined up with the appropriate indicia on the dial/button 1 in order to achieve the desired function. In the configuration shown in FIGS. 5a and 5b, the dial/button 1 is in the fully depressed position, and rotated counterclockwise so that the nubs 25 on the inside surface of the dial/button 1 are in the bottom horizontal slot 30, locking the dial/button 1 into a closed position.

According to a preferred embodiment, the bottom horizontal slot 30 has a slight downward slant before becoming horizontal to draw the dial/button 1 down slightly as it is rotated into the closed position, see FIG. 1e, causing the bottom surface of the dial/button 1 to bear down on the fluid delivery channel 13, pinching it shut. As shown in FIGS. 5a and 5b, the indicia on the collar 3 lines up with a "<Open" indicia on the button 1, showing that in order to dispense fluid, the dial/button 1 must be rotated clockwise until the nubs line up with the "FULL" vertical slot. If the user wishes to dispense only a half dose, the dial/button 1 must be rotated clockwise again until the nubs 25 line up with the correspondingly shorter/shallower vertical channel/slot.

Figure 6A:
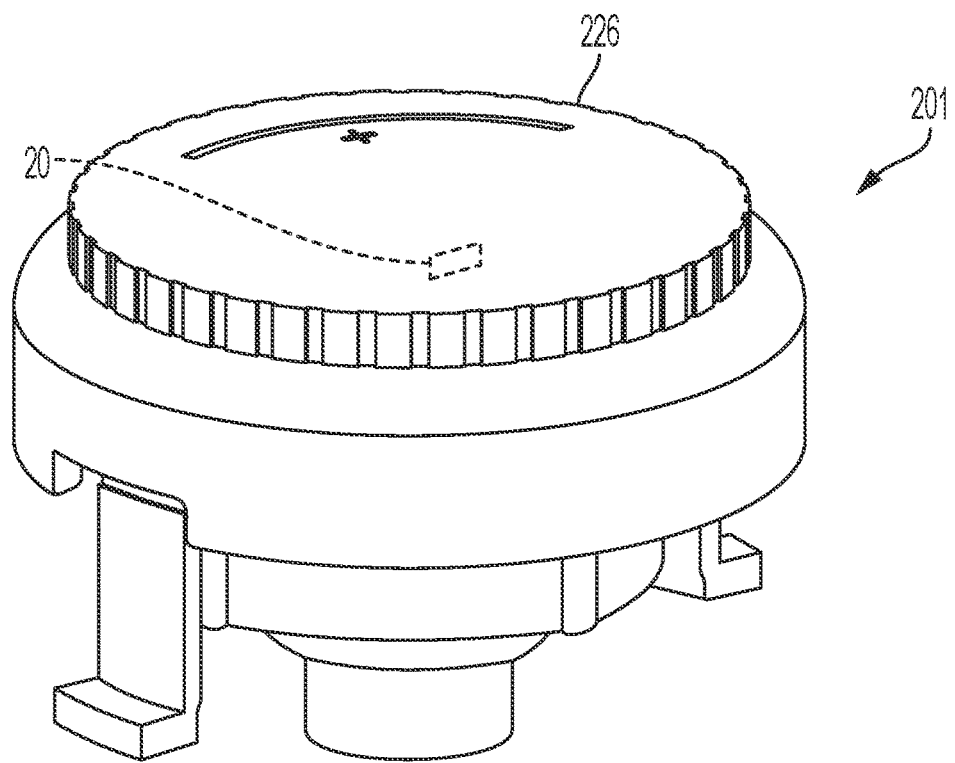
FIG. 6a is a perspective view of an adjustable fluid dosing dispenser according to another embodiment.
Figure 6B:
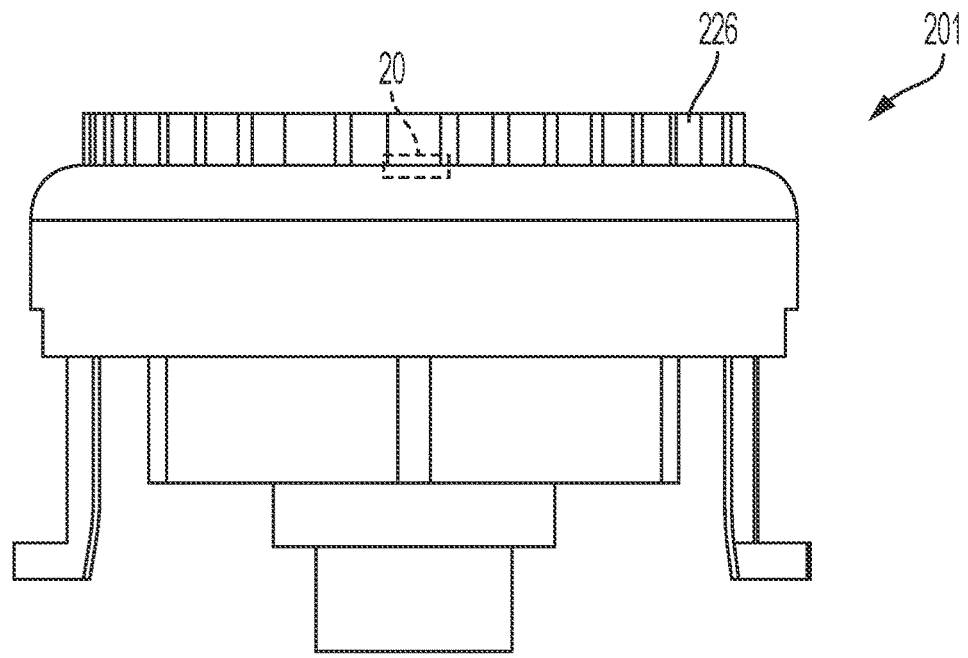
Figure 6C:
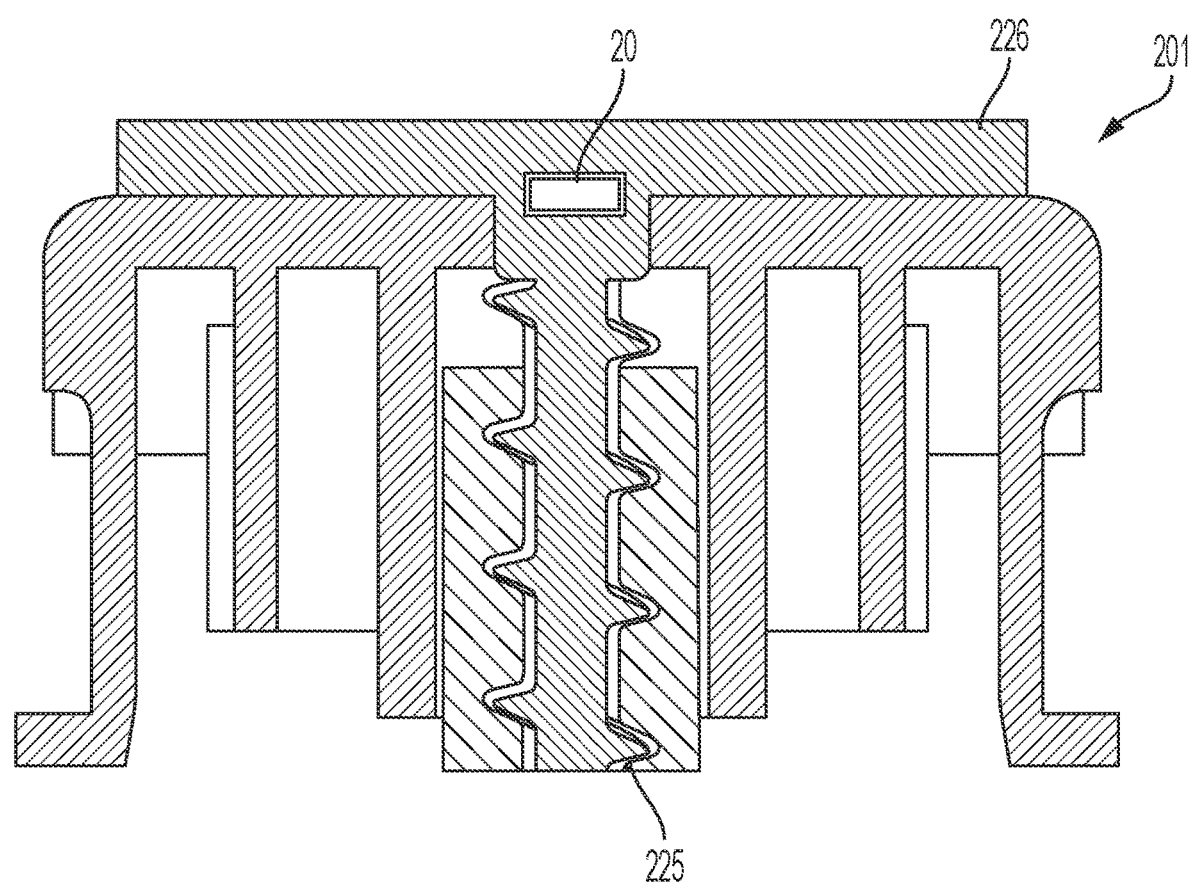
FIG. 6c is a side cross-sectional view of the adjustable fluid dosing dispenser according to the embodiments of FIGS. 6a and 6b.

FIGS. 6a, 6b and 6c show an alternative design of an adjustable fluid dispensing device according to the invention. Instead of the nub and slot interaction of the device shown in FIGS. 1a-1d, 2, 4, 5a and 5b, the embodiment of FIGS. 6a, 6b and 6c contains a central screw 225 that can be turned by the top dial portion 201 for a continuous dose adjustment device. As the screw 225 is turned, the maximum depression of the button 201 is increased or decreased as the screw 225 moves the button 201 toward or away from the dosing control collar 3. As with the embodiment of FIGS. 1a-1d, 2, 4, 5a and 5b, a sensor 20 or other smart chip may be arranged to detect the rotation and hence the dosage amount.

Figure 7A:
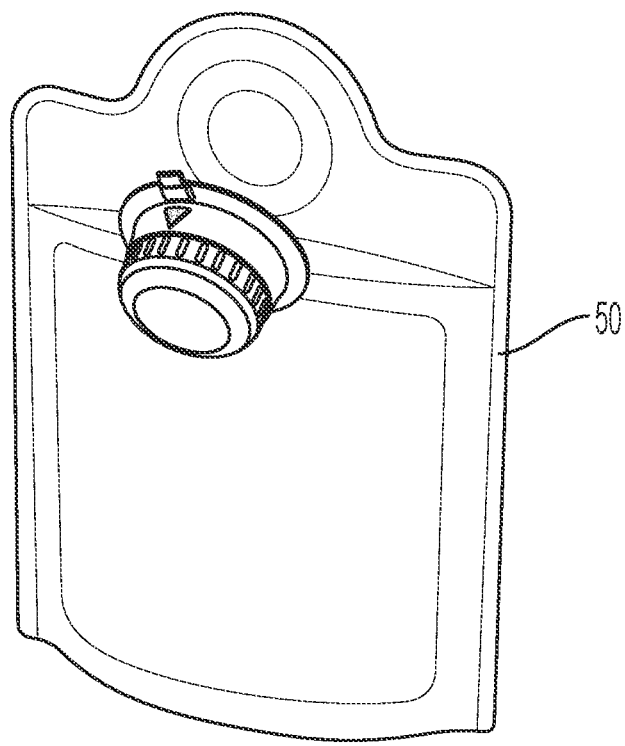
FIG. 7a is a perspective view of an adjustable fluid dosing dispenser according to an embodiment of the invention proximate to a matching opening in a flexible fluid container.
Figure 7B:
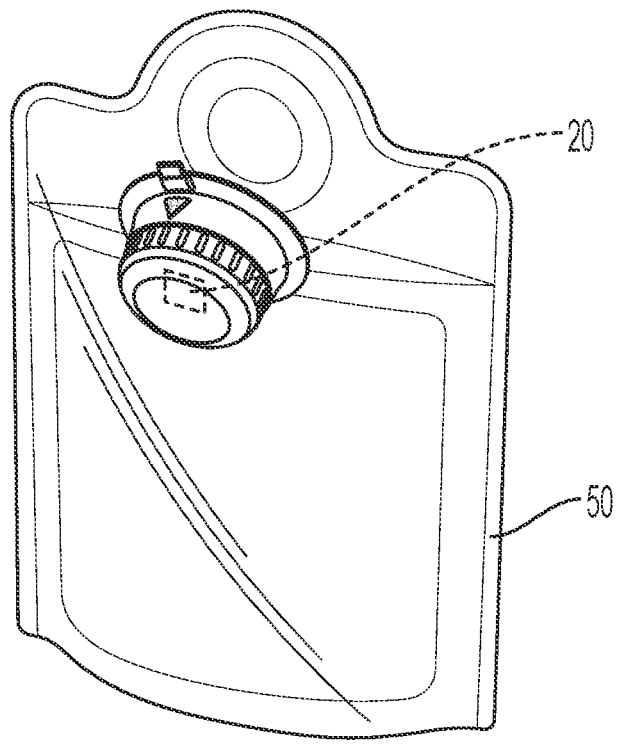
FIG. 7*b* is an alternate rendition of the embodiment shown in FIG. 7*a*.

FIGS. 7a and 7b show the adjustable metering device of the invention about to be connected to a flexible fluid container 50, preferably a bag or pouch. According to a preferred embodiment, the fluid container 50 is collapsible as fluid is dispensed therefrom and preferably contains no air. According to one embodiment, the bottom of the adjustable metering device has an adhesive that makes a secure and air-tight connection to the fluid container 50. According to a further embodiment, the adhesive may be covered prior to use with a thin pull-away film to protect and preserve the adhesive until it is time to connect the device to the fluid container 50. According to various alternative embodiments, the bottom of the adjustable metering device may be heat welded to the fluid container 50, sonic welded to the fluid container 50 or sealed to the fluid container 50 in any other known method. According to a further embodiment, the fluid container 50 may have a reinforced region and/or treated surface that corresponds to the shape and size of the device to facilitate strong and secure connection and prevent container breaking or tearing should a force or load be applied to the device after it has been attached to the fluid container 50.

Figure 8A:
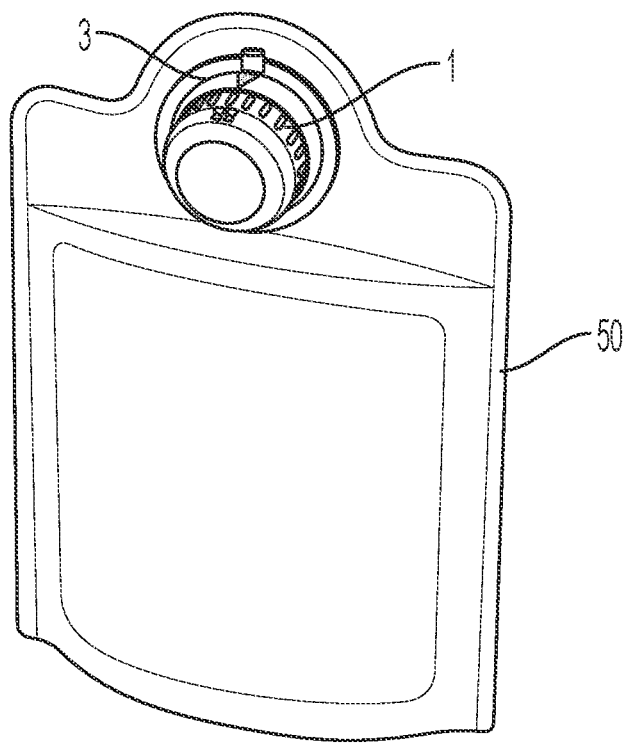
FIG. 8*a* is a perspective view of an adjustable fluid dosing dispenser attached to the surface of a flexible fluid container according to an embodiment of the invention.
Figure 8B:
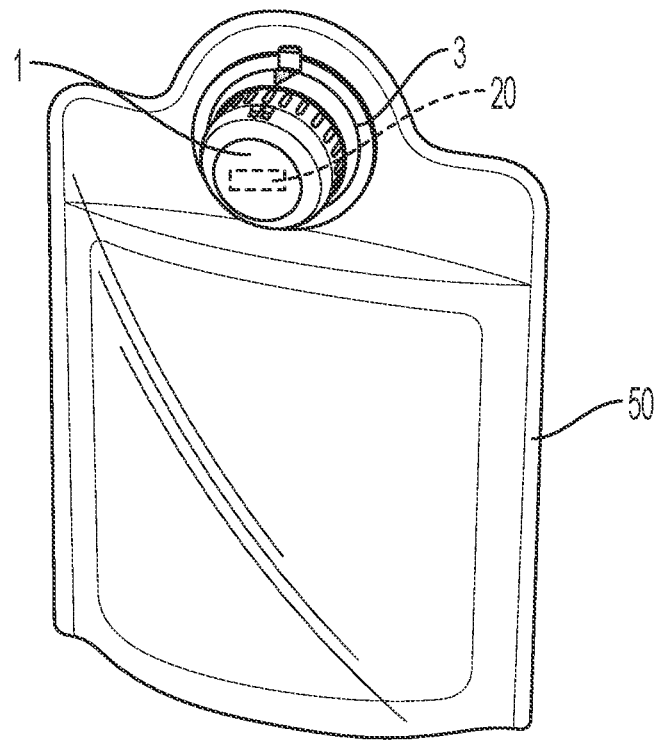
FIG. 8*b* is an alternate rendition of the embodiment shown in FIG. 8*a*.

FIGS. 8a and 8b show an adjustable metering device of the invention connected to a flexible fluid container 50. The device can be operated to dispense fluid no matter the orientation of the device in space, as it is agnostic to gravity or other forces except for the depression of the dial/button 1.

Application will represent educational materials on the fluid being dispensed.

Compliance measured by actual pressure on the button 1 and number of times pushed. Time and date captured. Ability to reorder when pouch is close to deletion.

Smartphone application automatically track the dose size and time using either the mechanical or sensor technologies.

Data can be shared with physician, pharmacy, retailers, manufacturers or others, as permissible by users, requiring compliance, monitoring and reordering capabilities. Sensor 20 and app technologies allow for identification of reorder options using GPS technologies or online ordering applications.

According to an embodiment the fluid can be of any viscosity.

According to another embodiment RFID, sensor stickers, Bluetooth and other sensor technologies are used.

The user will download the app. The app will pick up the sensor signal from the sensor technology and prompt for educational and compliance engagement.

The app will automatically capture dose, time of dose, prompt for next dose, and alert when near depletion, requiring a reorder.

This is doable from day one using readily available sensor technologies.

The app will alert when the dose is due.

Pressure sensor 20 in the "button" sends a signal that the fluid was dispensed and how much. 1 TOUCH dispensing technology indicates dosage.

Patient can provide permissions through the app to share with physician, pharmacy, retailers, manufacturers or others requiring compliance, monitoring and reordering capabilities.

Sensor technologies provide automatic tracking to ensure ease of use. GPS enables realtime capabilities for reorder and retail opportunities.

The invention claimed is:

1. An apparatus comprising:
   a flexible and collapsible fluid container;
   a fluid dispenser pump connected to said flexible and collapsible fluid container configured to draw fluid from said flexible and collapsible fluid container into said fluid dispenser pump and to dispense fluid through a fluid delivery channel to an exit port upon action of said pump, the dispenser pump having an actuator comprising a dose delivery button which, upon depression by a user, actuates the fluid dispenser pump to dispense a dose of the fluid;
   a sensor located in said apparatus and configured to measure a physical property upon actuation depression of the dose delivery button of said fluid dispenser pump by a user; and
   a wireless transmission module in communication with said sensor configured to communicate said physical property to a remote device upon depression of the dose delivery button of said fluid dispenser pump by the user;
   wherein the wireless transmission module communicates the physical property to the remote device only upon depression of the dose delivery button.

2. An apparatus according to claim 1, wherein said physical property is selected from the group consisting of fluid pressure inside said fluid dispenser pump, time of day, volume of fluid flowing through said exit port.

3. An apparatus according to claim 1, wherein said remote device is a computer server.

4. An apparatus according to claim 1, wherein said remote device is a mobile device.

5. An apparatus according to claim 1, wherein said flexible and collapsible fluid container includes a computer readable identification code printed thereon or attached thereto.

6. An apparatus according to claim 5, wherein said computer readable identification code is configured to cause product information relating to said fluid to be displayed on a user's mobile device when said user's mobile device is used to read said computer readable identification code.

7. An apparatus for dispensing and monitoring fluid dispensed comprising:
- a flexible and collapsible fluid container;
- a fluid dispenser pump connected to the flexible and collapsible fluid container configured to draw fluid from the flexible and collapsible fluid container into the fluid dispenser pump and to dispense fluid through a fluid delivery channel to an exit port upon actuation of the pump, the dispenser pump having an actuator comprising a dose delivery button which, upon depression by a user, actuates the fluid dispenser pump to dispense a dose of fluid;
- a sensor located in the apparatus and configured to measure a physical change upon depression of the dose delivery button of the fluid dispenser pump by a user, the physical change comprising information on the amount of fluid dispensed; and
- a wireless transmission module in communication with the sensor configured to communicate the physical change to a remote device depression of the dose delivery button of the fluid dispenser pump by the user;
- wherein the wireless transmission module communicates the physical change to the remote device only upon depression of the dose delivery button.

8. An apparatus according to claim 7, wherein the sensor is located inside or beneath the dose delivery button.

9. An apparatus according to claim 7, wherein the sensor is located in the fluid delivery channel.

10. An apparatus according to claim 7, wherein the dose delivery button is adjustable by the user to adjust the amount of the dose of the fluid dispensed upon actuation by the user.

11. An apparatus for dispensing and monitoring fluid dispensed comprising:
- a flexible and collapsible fluid container;
- a fluid dispenser pump connected to the flexible and collapsible fluid container configured to draw fluid from the flexible and collapsible fluid container into the fluid dispenser pump and to dispense fluid through a fluid delivery channel to an exit port upon actuation of the pump, the dispenser pump having an actuator comprising a dose delivery button which, upon depression by a user, actuates the fluid dispenser pump to dispense a dose of fluid;
- a sensor to determine adjustment state of the actuator;
- a second sensor located in the fluid delivery channel and configured to measure a physical change upon depression of the dose delivery button of the fluid dispenser pump by a user, the physical change comprising information on the amount of fluid dispensed; and
- a wireless transmission module in communication with the second sensor configured to communicate the physical change to a remote device depression of the dose delivery button of the fluid dispenser pump by the user.

12. An apparatus according to claim 7, wherein the flexible and collapsible fluid container includes a computer readable identification code, and the computer readable identification code is configured to cause product information relating to the fluid to be displayed on the remote device.

13. A method of dispensing and monitoring fluid dispensed from an apparatus comprising:
providing a flexible and collapsible fluid container; a fluid dispenser pump connected to the flexible and collapsible fluid container configured to draw fluid from the flexible and collapsible fluid container into the fluid dispenser pump and to dispense fluid through a fluid delivery channel to an exit port upon actuation of the pump, the dispenser pump having an actuator comprising a dose delivery button which, upon depression by a user, actuates the fluid dispenser pump to dispense a dose of fluid; a sensor located in the apparatus and configured to measure a physical change upon actuation of the fluid dispenser pump by the user, the physical change comprising information on an amount of fluid dispensed; and a wireless transmission module in communication with the sensor configured to communicate the physical change to a remote device;

depressing, by the user, the dose delivery button to actuate the fluid dispenser pump to dispense the fluid from the flexible and collapsible fluid container through the exit port;

upon depression by the user of the dose delivery button, sensing by the sensor information on the amount of fluid dispensed from the exit port; and wirelessly transmitting information on the amount of fluid dispensed from the sensor to a remote device only upon depression of the dose delivery button of the fluid dispenser pump by the user.

14. A method according to claim 13, wherein the sensor is located inside or beneath the dose delivery button, or in the fluid delivery channel.

15. A method according to claim 13, wherein the flexible and collapsible fluid container includes a computer readable identification code including product information relating to the fluid, and further including wirelessly transmitting and the computer readable identification code to cause product information relating to the fluid to be displayed on the remote device.

16. A method of dispensing and monitoring fluid dispensed from an apparatus comprising:
providing a flexible and collapsible fluid container; a fluid dispenser pump connected to the flexible and collapsible fluid container configured to draw fluid from the flexible and collapsible fluid container into the fluid dispenser pump and to dispense fluid through a fluid delivery channel to an exit port upon actuation of the pump, the dispenser pump having an actuator comprising a dose delivery button which, upon depression by a user, actuates the fluid dispenser pump to dispense a dose of fluid, wherein the actuator is adjustable by the user to adjust the amount of the dose of the fluid dispensed upon actuation by the user, and including a sensor to determine adjustment state of the actuator; a sensor located in the apparatus and configured to measure a physical change upon actuation of the fluid dispenser pump by the user, the physical change comprising information on an amount of fluid dispensed; and a wireless transmission module in communication with the sensor configured to communicate the physical change to a remote device;

depressing, by the user, the dose delivery button to actuate the fluid dispenser pump to dispense the fluid from the flexible and collapsible fluid container through the exit port;

upon depression by the user of the dose delivery button, sensing by the sensor information on the amount of fluid dispensed from the exit port; and wirelessly transmitting information on the amount of fluid dispensed from the sensor to a remote device upon depression of the dose delivery button of the fluid dispenser pump by the user, and further including wirelessly transmitting information on the adjustment state of the actuator to the remote device.

* * * * *